United States Patent [19]
Gottzmann et al.

[11] Patent Number: 5,820,655
[45] Date of Patent: Oct. 13, 1998

[54] SOLID ELECTROLYTE IONIC CONDUCTOR REACTOR DESIGN

[75] Inventors: Christian Friedrich Gottzmann, Clarence; Ravi Prasad; Victor Emmanuel Bergsten, both of E. Amherst; Nitin Ramesh Keskar, Grand Island; Bart Antonie van Hassel, Williamsville, all of N.Y.

[73] Assignee: Praxair Technology, Inc., Danbury, Conn.

[21] Appl. No.: 848,204

[22] Filed: Apr. 29, 1997

[51] Int. Cl.$^6$ .................................................. B01D 53/22
[52] U.S. Cl. ........................ 95/54; 96/8; 96/10; 422/173; 422/205; 422/239
[58] Field of Search .......................... 55/267–269; 95/45, 95/54; 96/4, 8, 10, 11; 422/120, 129, 149, 163, 173, 198, 205, 239

[56] References Cited

U.S. PATENT DOCUMENTS

| | | | |
|---|---|---|---|
| 1,685,759 | 9/1928 | Walter | 95/54 X |
| 3,550,355 | 12/1970 | Remus et al. | 95/54 |
| 3,847,672 | 11/1974 | Trocciola et al. | 96/4 X |
| 3,849,076 | 11/1974 | Gryaznov et al. | 96/11 X |
| 3,901,669 | 8/1975 | Seitzer | 95/54 X |
| 4,120,663 | 10/1978 | Fally | 422/239 X |
| 4,590,044 | 5/1986 | Mos et al. | 422/205 X |
| 5,108,465 | 4/1992 | Bauer et al. | 95/54 |
| 5,160,713 | 11/1992 | Mazanec et al. | 423/210 |
| 5,169,415 | 12/1992 | Roettger et al. | 95/54 |
| 5,229,102 | 7/1993 | Minet et al. | 422/239 X |
| 5,240,473 | 8/1993 | Carolan et al. | 95/54 |
| 5,240,480 | 8/1993 | Thorogood et al. | 95/54 X |
| 5,306,411 | 4/1994 | Mazanec et al. | 204/265 |
| 5,342,431 | 8/1994 | Anderson et al. | 95/45 |
| 5,384,051 | 1/1995 | McGinness | 422/239 X |
| 5,384,101 | 1/1995 | Rockenfeller | 96/11 X |
| 5,447,555 | 9/1995 | Yee et al. | 95/54 |
| 5,480,620 | 1/1996 | Cameron | 422/239 X |
| 5,516,359 | 5/1996 | Kang et al. | 95/14 |
| 5,547,494 | 8/1996 | Prasad et al. | 95/54 |
| 5,552,039 | 9/1996 | McBrayer, Jr. et al. | 422/205 X |
| 5,565,017 | 10/1996 | Kang et al. | 95/14 |
| 5,599,383 | 2/1997 | Dyer et al. | 96/8 |
| 5,611,931 | 3/1997 | Liu et al. | 210/653 |
| 5,614,001 | 3/1997 | Kosaka et al. | 96/11 X |
| 5,681,373 | 10/1997 | Taylor et al. | 96/11 |
| 5,702,999 | 12/1997 | Mazanec et al. | 95/54 X |
| 5,712,220 | 1/1998 | Carolan et al. | 95/54 X |

FOREIGN PATENT DOCUMENTS

| | | |
|---|---|---|
| 0732138 | 9/1996 | European Pat. Off. . |
| 0747108 | 12/1996 | European Pat. Off. . |
| 06-134244 | 5/1994 | Japan ........................................... 96/8 |
| 0573444 | 10/1977 | U.S.S.R. ...................................... 96/8 |
| 1472104 | 4/1989 | U.S.S.R. ...................................... 96/8 |
| 2257054 | 1/1993 | United Kingdom ....................... 95/54 |

OTHER PUBLICATIONS

Bevc et al., "SureCell Integrated Solid Oxide Fuel Cell Power Plants for Distributed Power Applications", Power-Gen 1995 –Americas, pp. 1–18 (1995).

*Primary Examiner*—Robert Spitzer
*Attorney, Agent, or Firm*—Douglas E. Denninger

[57] ABSTRACT

An ion transport reactor and process for using same having at least one ion transport membrane with a retentate side and a permeate side, for extracting oxygen from a feed gas stream as it flows along the retentate side. A reactant gas stream is flowed along the permeate side of the ion transport tubes to react with the oxygen transported therethrough. Heat is transferred to a fluid stream flowing through the ion transport reactor while the temperature of the membrane is maintained within its operating range.

22 Claims, 12 Drawing Sheets

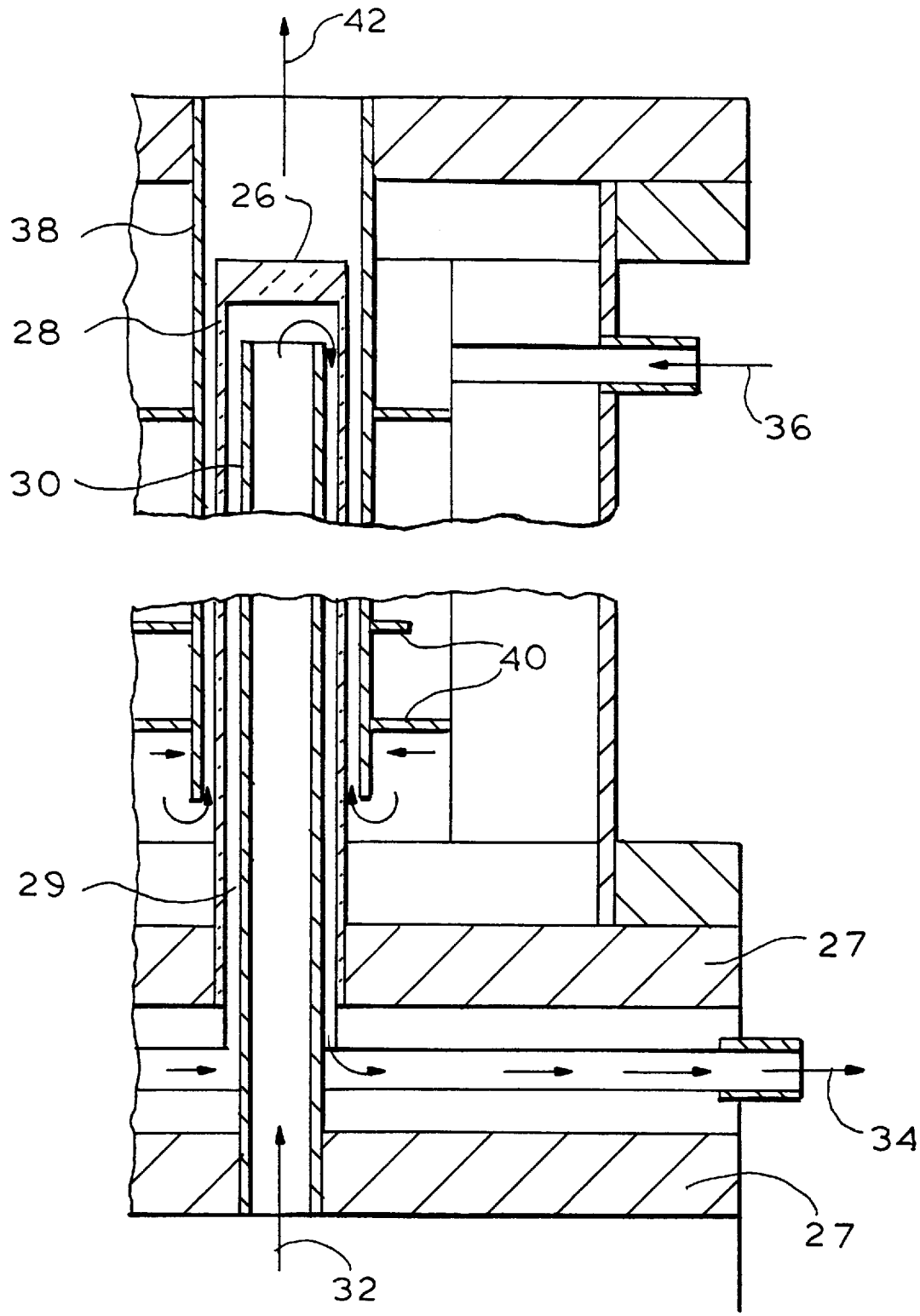
F I G. 2

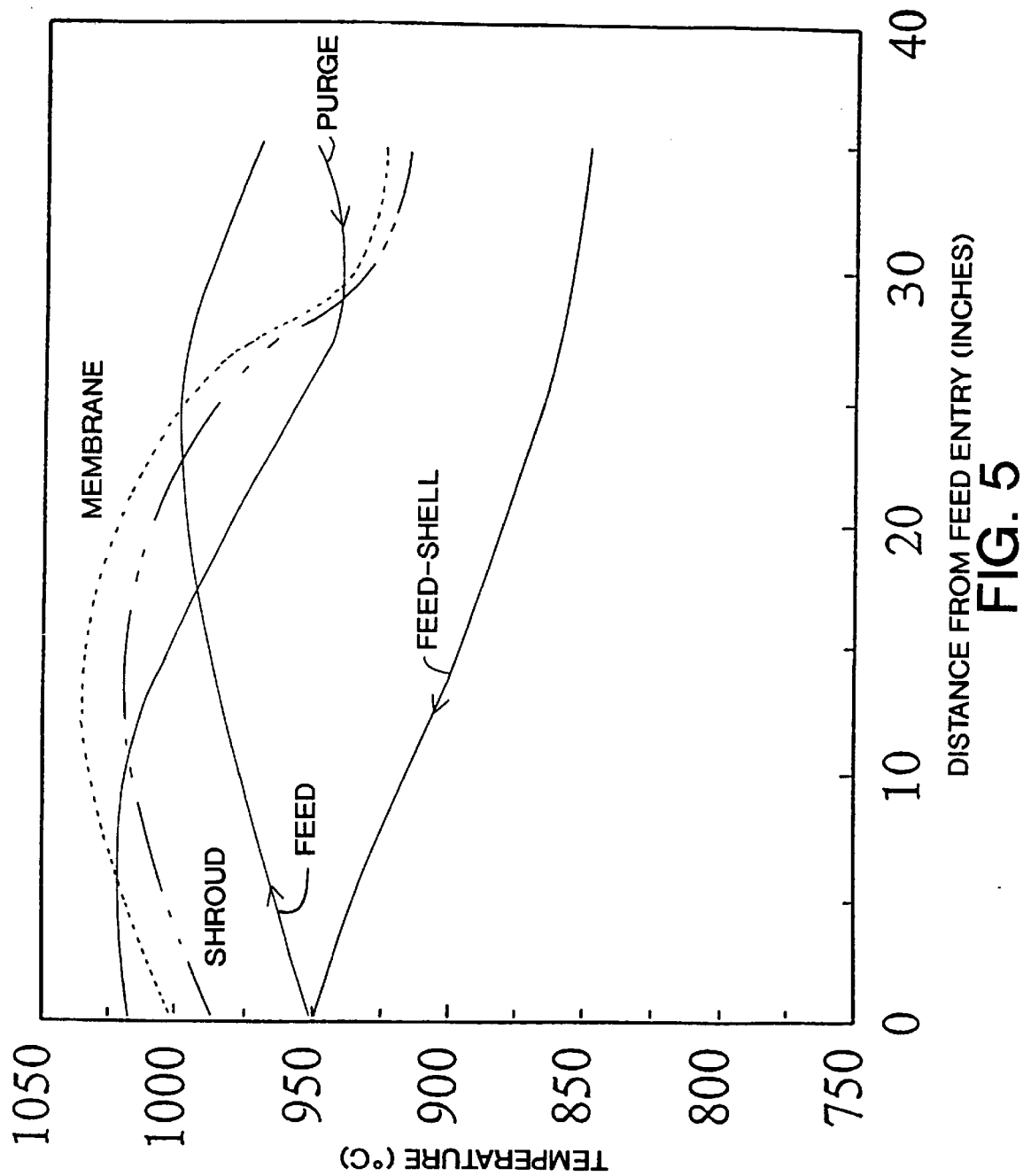

SOLID ELECTROLYTE IONIC CONDUCTOR REACTOR DESIGN

U.S. GOVERNMENT RIGHTS

This invention was made with United States Government support under Cooperative Agreement No. 70NANB5H1065 awarded by the National Institute of Standards and Technology. The United States Government has certain rights in the invention.

CROSS-REFERENCE

The application entitled "Integrated Solid Electrolyte Ionic Conductor Separator-Cooler", U.S. Ser. No. 08/848,199, filed concurrently herewith, is incorporated herein by reference.

FIELD OF THE INVENTION

The invention relates to a solid electrolyte ionic conductor reactor design for use in gas separating systems. The invention also relates to the combination of solid electrolyte ionic conductor heater/reactor designs and oxygen separator/reactor designs for use in gas separating systems.

BACKGROUND OF THE INVENTION

For many years non-cryogenic bulk oxygen separation systems, for example, organic polymer membrane systems, have been used to separate selected gases from air and other gas mixtures. Air is a mixture of gases which may contain varying amounts of water vapor and, at sea level, has the following approximate composition by volume: oxygen (20.9%), nitrogen (78%), argon (0.94%), with the balance consisting of other trace gases. An entirely different type of membrane, however, can be made from certain inorganic oxides. These solid electrolyte membranes are made from inorganic oxides, typified by calcium- or yttrium-stabilized zirconium and analogous oxides having a fluorite or perovskite structure. At elevated temperatures these materials contain mobile oxygen ion vacancies. Because these materials allow only oxygen permeation, they act as a membrane with an infinite selectivity for oxygen and are therefore very attractive for use in new air separation processes.

Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 700° C.–1200° C. range. This limitation remains despite much research to find materials that work well at lower temperatures. Solid electrolyte ionic conductor technology is described in more detail in Prasad et al., U.S. Pat. No. 5,547,494, entitled *Staged Electrolyte Membrane,* which is hereby incorporated by reference to more fully describe the state of the art.

The development of mixed and dual phase solid oxide ion and electron conductor materials has created interesting opportunities for utilizing processes which exploit their ability to transport oxygen ions and the return flow of electrons across a solid electrolyte membrane without the need for external circuits. The solid electrolyte separation process is driven by the chemical potential caused by the ratio of partial oxygen pressures of an oxygen-containing gas on the cathode and partial oxygen pressures in a reactive environment on the anode. There are many examples of systems utilizing this effect. These include the removal of residual oxygen from inert gases, such as argon and nitrogen (a deoxo process); the co-production of oxygen, nitrogen, argon, and carbon dioxide in integrated gas turbine cycles; systems for producing nitrogen, oxygen and carbon dioxide; partial oxidation reactors for use in chemical oxidation processes such as the generation of syngas (for example, the British Petroleum Electropox method); and combustor applications where the fact that the oxidation reaction occurs on the surface of the solid electrolyte ionic conductor element at the anode excludes nitrogen and thereby, with proper heat management, limits temperature rise and $NO_x$ generation.

To be practical, any of the above processes require reactors that can perform the assigned functions in an efficient manner. This invention specifically relates to the basic design principles for the solid electrolyte reactor and solid electrolyte reactor combinations required for effective and efficient operation. Since in these devices heat is produced on the anode side of the ion transport membrane by the oxidation reaction, it is important to manage heat transfer to maintain the temperature of the solid electrolyte ionic conductor elements at as uniform a temperature as possible. If portions of the solid electrolyte ionic conductor elements operate at too low a temperature, oxygen fluxes for these portions are reduced; if portions operate at too high a temperature the useful operating life of these portions could be significantly lowered. In addition, the design has to provide for effective mass transfer of oxygen and fuel to the cathode and anode sides respectively and balance oxygen flux and reaction kinetics in a way which maintains an oxygen partial pressure at the anode surface greater than $10^{-14}$ to $10^{-16}$ atm. depending on the stability characteristics of the element material employed. Most known materials tend to severely deteriorate at very low oxygen pressures due to loss of oxygen from their lattice structure.

A secondary purpose of the invention is to define configurations which provide workable solutions for combining solid electrolyte reactors with other functions such as heating of a third gas stream or separating an oxygen product from the cathode side stream by means of a second solid electrolyte membrane in a single apparatus. The integration of the above functions must be accomplished in a manner which does not impede the previously stated requirements for heat management and mass transfer.

Advances in the state of the art of air separation using solid electrolyte ionic conductors have been presented in the technical literature.

For example, Mazanec et al., U.S. Pat. No. 5,306,411, entitled *Solid Multi-Component Membranes, Electrochemical Reactor Components, Electrochemical Reactors and Use of Membranes, Reactor Components, and Reactor for Oxidation Reactions,* relates to electrochemical reactors for reacting an oxygen-containing gas with an oxygen-consuming gas and describes a shell and tube reactor with the oxygen-containing gas flowing on one side of the solid electrolytic membrane and the oxygen-consuming gas on the other. Mazanec et al., however, does not address issues related to heat management to maintain membrane surfaces at the desired uniform temperatures, flow dynamics to achieve effective mass transfer, or the need for balancing reaction kinetics with oxygen ion conductivity to maintain the appropriate oxygen partial pressure for materials stability.

Westinghouse has developed solid oxide fuel cells having a tubular design, such as described in the publication presented at *PowerGen* 1995—*Americas* Conference in Anaheim, Calif., on Dec. 5–7, 1995, by Frank P. Bvec and Walter G. Parker, *SureCELL™ Integrated Solid Oxide Fuel Cell Power Plants for Distributed Power Applications*. This publication relates to tubular solid oxide fuel systems with geometries that have superficial similarity to some of the geometries of the present invention but the geometries are not, however, related to the functions performed by solid electrolyte reactors of the instant invention. Bvec and Parker describe a closed end fuel cell element where the air is supplied to the inner cathode side of the solid electrolyte membrane by a coaxial inside tube which results in the air being preheated before entering the cathode passage where oxygen transfer takes place. Bvec and Parker, however, do not address issues of heat management and flow dynamics. In addition, the Westinghouse device, unlike the present invention, is not a reactor to produce heat or a desired anode side product but a fuel cell to produce electric power and therefore cannot employ mixed or dual phase conductors as the electrolyte. Furthermore, the Westinghouse solid oxide fuel cell designs (see FIG. 4 therein) are also low pressure devices while the reactors of the present invention would typically experience elevated pressure at least on one side of the solid electrolyte membrane.

A tubular solid-state membrane module is disclosed in Dyer et al., U.S. Pat. No. 5,599,383, having a plurality of tubular membrane units, each unit having a channel-free porous support and a dense mixed conducting oxide layer supported thereon. The porous support of each unit is in flow communication with one or more manifolds or conduits to discharge oxygen which has permeated through the dense layer and the porous support.

OBJECTS OF THE INVENTION

It is therefore an object of the invention to provide an efficient ion transport reactor design for use in gas separating systems.

It is also an object of the invention to combine the ion transport reactors with heaters to produce heater/reactor designs for use in gas separating systems.

It is another object of the invention to combine the ion transport reactors with an oxygen separator to produce oxygen separator/reactor designs for use in gas separating systems.

It is a further object of the invention to increase the efficiency of the designs by purging the permeate side of the ion transport membrane with a reactive gas stream.

It is a further object of the invention to increase the efficiency of the designs by optimizing mass transfer and thermal transfer in the reactor by choice of materials, input rates, and gas flow geometry.

SUMMARY OF THE INVENTION

The invention comprises an ion transport reactor and processes for using the same to react a reactant gas stream with oxygen from a feed gas stream containing elemental oxygen and at least one other gas. The ion transport reactor includes an ion transport membrane having a retentate side and a permeate side. The process includes flowing the feed gas stream on the retentate side of the ion transport membrane and flowing the reactant gas stream on the permeate side of the ion transport membrane. The heat generated from the reactant gas stream reacting with the oxygen permeating through the ion transport membrane is transferred to the feed gas stream to heat the feed gas stream while maintaining the temperature of the ion transport membrane within the operation range of the ion transport membrane.

In a preferred embodiment of the invention, the operation range is from about 500° C. to about 1110° C. In another preferred embodiment of the invention, the temperature along the ion transport membrane is kept substantially constant throughout the length of the membrane. In yet another preferred embodiment of the invention, the resistances to oxygen permeation and reaction kinetics are apportioned such that the partial pressure of oxygen on the permeate side of the membrane is kept above $10^{-16}$ atm. In another preferred embodiment, the ion transport membrane has porous catalyst layers added to at least part of the permeate side of the ion transport membrane to enhance the chemical reactions on the surface. In yet another preferred embodiment, at least part of one side of the membrane of the ion transport tubes is doped to enhance surface exchange kinetics. In still another preferred embodiment of the invention, the flow of the feed gas stream is channeled along the retentate surface of the ion transport membrane through a feed gas passage between the ion transport membrane and a shroud to minimize gaseous diffusion resistance.

In another preferred embodiment of the invention, at least a portion of the heat from the heat of reaction generated by operation of the ion transport tube is transferred to a fluid stream, such as the feed gas stream, flowing through the ion transport reactor. In yet another preferred embodiment of the invention, at least one of the heat transfer areas and heat transfer coefficients vary inversely with the difference in temperature ($\Delta T$) between the feed gas stream and the ion transport membrane. In another preferred embodiment of the invention, the feed gas stream is divided into a first feed gas portion which is fed into the reactor and provides oxygen for reacting with the reactant gas stream, whereby heat is generated, the heat being then employed to heat the first feed gas portion which transfers heat to an ion transport separator module including an ion transport separator membrane having a retentate side and a permeate side through which a second feed gas portion flows and from which oxygen is extracted along the permeate side thereof. In yet another preferred embodiment of the invention, the feed gas stream first enters a separator stage where additional oxygen is extracted, by pressure-driven ion transport using an ion transport separator membrane, to a nonreacting gas side and the feed gas stream then enters the ion transport reactor where additional oxygen is extracted using the ion transport membrane to react with the reactant gas stream to produce a reaction product gas stream which is then used to purge the permeate side of the ion transport separator membrane.

In one embodiment, the ion transport reactor comprises at least one ion transport tube having a membrane capable of transporting oxygen ions, the ion transport membrane having a retentate side and a permeate side, for extracting oxygen from the feed gas stream as it flows along the retentate side. During operation, a reactant gas stream is flowed along the permeate side of the ion transport tubes to react with the oxygen permeating therethrough, at least a portion of the heat from the heat of reaction generated by operation of the ion transport tube is transferred to a fluid stream flowing through the ion transport reactor, and at least one of the heat transfer areas and heat transfer coefficients vary inversely with the difference in temperature between the feed gas stream and the ion transport membrane.

In a preferred embodiment of the invention, the ion transport reactor further comprises a concentric tube within or surrounding at least part of each ion transport tube to form an annular passage therebetween for directing the flow of the feed gas stream along the ion transport tube. In another preferred embodiment, at least one of the heat transfer areas and heat transfer coefficients vary along the length of the feed gas passage on the shell side by virtue of variable baffle spacing to achieve large heat transfer resistance where the difference in temperature is large and to achieve small heat transfer resistance where the difference in temperature is small or by virtue of variable insulation thickness. In yet another preferred embodiment of the invention, the ion transport tube is closed at one end. In still another preferred embodiment of the invention, the feed gas stream flows in a cross-counter, concurrent or countercurrent flow direction with respect to the ion transport tube.

BRIEF DESCRIPTION OF THE DRAWINGS

Other objects, features and advantages of the invention will occur to those skilled in the art from the following description of preferred embodiments and the accompanying drawings, in which:

FIG. 2 is a schematic diagram of another embodiment of the invention similar to FIG. 1 wherein the ends of the ion transport tubes are closed and sealed at their tops by a top cover and are left free floating to avoid stresses and concentric inner tube are added inside each ion transport tube for either supply or withdrawal of reaction side gases;

FIG. 5 is a graph showing the calculated temperature profiles of various elements of the reactor of FIG. 4 as a function of distance from the feed entry;

DETAILED DESCRIPTION OF THE INVENTION

Figure 1:
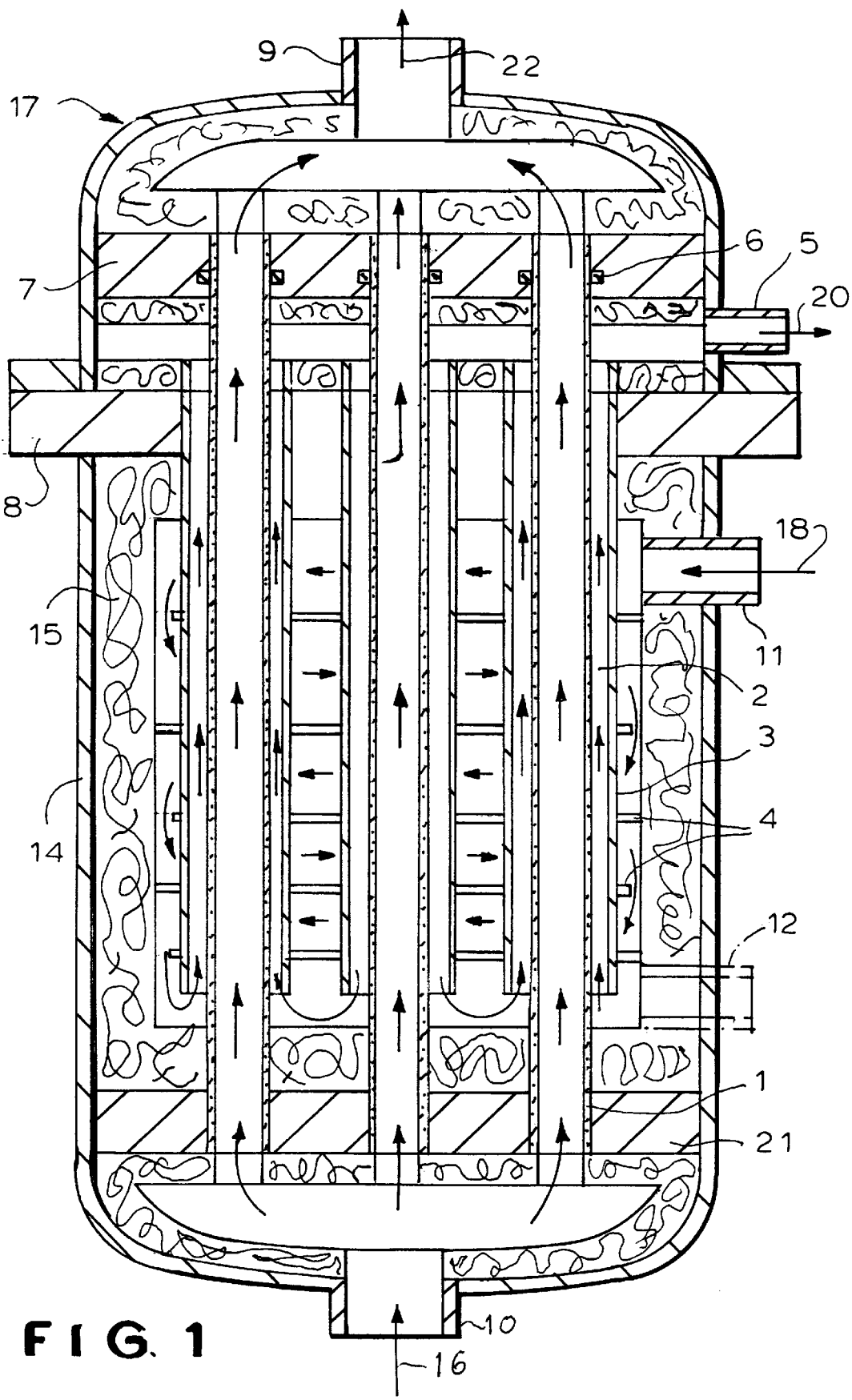
FIG. 1 is a schematic diagram of an embodiment of the invention showing the basic design of a ion transport reactor of the invention featuring a through tube arrangement where a sliding tube-to-tube sheet seal accommodates thermal and compositional dimensional changes in the ion transport tube.

The invention relates to a solid electrolyte ionic conductor reactor design for use in gas separating systems. The invention also relates to the combination of solid electrolyte ionic conductor reactor/heater designs and reactor/oxygen separator designs.

In contrast to the prior art, this invention provides all the functional requirements which solid electrolyte reactors must satisfy to be feasible and practical and discloses how the reactor function can be advantageously combined with other operations. Specifically, the invention incorporates heat transfer means such that the heat of reaction is removed from the solid electrolyte ionic conductor elements, thereby maintaining the solid electrolyte ionic conductor elements at fairly constant temperature. This is achieved by varying local heat transfer coefficients and heat transfer area as necessary by the selection of appropriate heat transfer surface geometry, including the possible addition of an insulating layer, and of appropriate local flow velocities. At the same time, efficient mass transfer of oxygen to the cathode surface and reactant to the anode surface of the membrane is assured by either high turbulence or narrow passage dimensions. In addition, attention is paid to the need for maintaining oxygen partial pressure at or near the anode surface at a level sufficiently high for long life of the specific mixed or dual phase conductor employed by balancing local oxygen flux and reaction kinetics. This is achieved by selection of a membrane with appropriate ion conductivity and thickness on the one hand and controlling catalytic activity by catalyst material and or surface area on the other.

Other functions, such as indirect heating of a third gas stream or a separation of an oxygen product stream by a suitable solid electrolyte membrane, are integrated to achieve optimum simplicity while satisfying the operational requirements discussed in the previous paragraph. As used herein, the terms "solid electrolyte ionic conductor", "solid electrolyte ion transport membrane", "ion transport membrane", or "solid electrolyte" are used to designate either an ionic-type material or a mixed conductor-type material unless otherwise specified.

As used herein, the term "elemental oxygen" means any oxygen that is uncombined with any other element in the Periodic Table. While typically in diatomic form, elemental oxygen includes single oxygen atoms, triatomic ozone, and other forms uncombined with other elements.

The term "high purity" refers to a product stream which contains less than ten percent by volume of undesired gases. Preferably the product is at least 98.0% pure, more preferably 99.9% pure, and most preferably at least 99.99% pure, where "pure" indicates an absence of undesired gases.

The invention will now be described in detail with reference to the figures in which like reference numerals are used to indicate like elements.

An embodiment of the invention is illustrated by the schematic diagram of FIG. 1 showing the basic design of a solid electrolyte ionic conductor reactor of the invention. Though the basic design features are common for all solid electrolyte ionic conductor reactors, the specific design addresses a deoxo application, for example, removal of 1% to 10% of the residual oxygen from a crude nitrogen or argon gas stream 18. The solid electrolyte ionic conductor reactor design of FIG. 1 features a tube and shell arrangement with a single tube sheet 21 on one end of the apparatus and two tube sheets 7 and 8 on the other end of the apparatus. The inside of shell 14 is thermally protected by insulation 15 and contains ion transport tubes 1 surrounded by shroud 3 and sealed and supported by o-ring seals 6. This sliding tube-to-tube sheet seal accommodates thermal and compositional dimensional changes in ion transport tube 1. Ion transport tubes 1 consist either of a dense wall solid oxide mixed or a dual phase conductor or a thin film solid oxide mixed or a dual phase conductor supported by a porous substrate. The ion transport material must have sufficient ability to conduct oxygen ions and electrons at the prevailing oxygen partial pressure in the temperature range from 400° C. to 1100° C. when a chemical potential difference is maintained across the ion transport membrane surface caused by a ratio in oxygen partial pressures across the ion transport membrane. Suitable ion transport materials are perovskites and dual phase metal-metal oxide combinations as listed in Table 1. Since the reactive environment on the anode side (permeate side) of the ion transport membrane in many applications creates very low partial oxygen pressures, the chromium-containing perovskites of Table 1 may be the preferred material since these tend to be stable in this environment, that is, they are not chemically decomposed at very low partial oxygen pressures. Optionally, porous catalyst layers, possibly made from the same perovskite material, may be added to both sides of the ion transport membrane to enhance oxygen surface exchange and the chemical reactions on these surfaces. Alternatively, the surface layer of the ion transport membrane may be doped, for example, with cobalt, to enhance surface exchange kinetics.

TABLE I

Material composition

1. $(La_{1-x}Sr_x)(Co_{1-y}Fe_y)O_{3-\delta}$ ($0 \leq x \leq 1$, $0 \leq y \leq 1$, $\delta$ from stoichimetry)
2. $SrMnO_{3-\delta}$
   $SrMn_{1-x}Co_xO_{3-\delta}$ ($0 \leq x \leq 1$, $0 \leq y \leq 1$, $\delta$ from stoichimetry)
   $Sr_{1-x}Na_xMnO_{3-\delta}$
3. $BaFe_{0.5}Co_{0.5}YO_3$
   $SrCeO_3$
   $YBa_2Cu_3O_{7-\beta}$ ($0 \leq \beta \leq 1$, $\beta$ from stoichimetry)
4. $La_{0.2}Ba_{0.8}Co_{0.8}Fe_{0.2}O_{2.6}$, $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ (x,x',x'',y,y',y'' all in 0–1 range)
   where: A,A',A'' = from groups 1, 2, 3 and f-block lanthanides
   B,B',B'' = from d-block transition metals
6. (a) Co—La—Bi type:
   | | | |
   |---|---|---|
   | Cobalt oxide | 15–75 mole % |
   | Lanthanum oxide | 13–45 mole % |
   | Bismuth oxide | 17–50 mole % |

(b) Co—Sr—Ce type:
   | | |
   |---|---|
   | Cobalt oxide | 15–40 mole % |
   | Strontium oxide | 40–55 mole % |
   | Cerium oxide | 15–40 mole % |

(c) Co—Sr—Bi type:
   | | |
   |---|---|
   | Cobalt oxide | 10–40 mole % |
   | Strontium oxide | 5–50 mole % |
   | Bismuth oxide | 35–70 mole % |

(d) Co—La—Ce type:
   | | |
   |---|---|
   | Cobalt oxide | 10–40 mole % |
   | Lanthanum oxide | 10–40 mole % |
   | Cerium oxide | 30–70 mole % |

(e) Co—La—Sr—Bi type:
   | | |
   |---|---|
   | Cobalt oxide | 15–70 mole % |
   | Lanthanum oxide | 1–40 mole % |
   | Strontium oxide | 1–40 mole % |
   | Bismuth oxide | 25–50 mole % |

(f) Co—La—Sr—Ce type:
   | | |
   |---|---|
   | Cobalt oxide | 10–40 mole % |
   | Lanthanum oxide | 1–35 mole % |
   | Strontium oxide | 1–35 mole % |
   | Cerium oxide | 30–70 mole % |
7. $Bi_{2-x-y}M'_xM_yO_{3-\delta}$ ($0 \leq x \leq 1$, $0 \leq y \leq 1$, $\delta$ from stoichimetry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where,
   x equals from zero to about 1.
9. One of the materials of $A_sA'_tB_uB'_vB''_wO_x$ family whose composition is disclosed in
   U.S. Pat. No. 5,306,411 (Mazanec et al.) as follows:
   A represents a lanthanide or Y, or a mixture thereof;

TABLE I-continued

Material composition

A' represents an alkaline earth metal or a mixture thereof;
B represents Fe;
B' represents Cr or Ti, or a mixture thereof;
B'' represents Mn, Co, V, Ni or Cu, or a mixture thereof;
and s, t, u, v, w, and x are numbers such that:
s/t equals from about 0.01 to about 100;
u equals from about 0.01 to about 1;
v equals from zero to about 1;
w equals from zero to about 1;
x equals a number that satisfies the valences of the A, A', B, B', B'' in the formula; and $0.9 < (s + t)/(u + v + w) < 1.1$
10. One of the materials of $La_{1-x}Sr_xCu_{1-y}M_yO_{3-\delta}$ family, where:
    M represents Fe or Co;
    x equals from zero to about 1;
    y equals from zero to about 1;
    $\delta$ equals a number that satisfies the valences of La, Sr, Cu, and M in the formula.
11. One of the materials of $Ce_{1-x}A_xO_{2-\delta}$ family, where:
    A represents a lanthanide, Ru, or Y; or a mixture thereof,
    x equals from zero to about 1;
    y equals from zero to about 1;
    $\delta$ equals a number that satisfies the valences of Ce and A in the formula.
12. One of the materials of $Sr_{1-x}Bi_xFeO_{3-\delta}$ family, where:
    A represents a lanthanide or Y, or a mixture thereof,
    x equals from zero to about 1;
    y equals from zero to about 1;
    $\delta$ equals a number that satisfies the valences of Ce and A in the formula.
13. One of the materials of $Sr_xFe_yCo_xO_w$ family, where:
    x equals from zero to about 1;
    y equals from zero to about 1;
    z equals from zero to about 1;
    w equals a number that satisfies the valences of Sr, Fe and Co in the formula.
14. Dual phase mixed conductors (electronic/ionic):

$(Pd)_{0.5}/(YSZ)_{0.5}$
    $(Pt)_{0.5}/(YSZ)_{0.5}$
    $(B—MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added.

During operation, oxygen-containing gas stream 18 enters shell 14 near the top of the reactor through port 11, flows downward in a cross-counter flow fashion, or optionally cross cocurrent fashion, to the flow of reactive purge or reactant gas stream 16 inside ion transport tubes 1 directed by baffles 4, and then enters annular passages 2 between ion transport tubes 1 and shroud 3 where oxygen is extracted from gas stream 18 by transport radially inwardly through tubes 1. Gas stream 18 is recovered through port 5 as an oxygen-depleted gas stream 20 from the space between tube sheets 7 and 8. Reactant gas stream 16 enters through port 10 and flows inside ion transport tubes 1 which reacts with the oxygen gas as it permeates through ion transport tubes 1 to produce a gas stream 22 which exits the reactor.

The oxygen for the reaction on the permeate side of ion transport tubes 1 is extracted by ion transport from oxygen-containing gas stream 18 flowing through annular passages 2. Gaseous diffusion resistance is minimized by the narrow width, preferably 0.5–4 mm and more preferably 0.8–3 mm, of annular passages 2 between ion transport tubes 1 and their respective shrouds 3. The reaction takes place in the boundary layer or on the anode surface (permeate side) of ion transport tubes 1. As a result, the maximum temperature will be at the wall of ion transport tubes 1. The concentric arrangement of ion transport tubes 1 and shroud tubes 3 assures excellent radiation heat transfer coupling between them and, since at the high operating temperatures radiation heat transfer is very efficient, the local temperatures of shroud tubes 3 will follow the local temperature of their respective ion transport tubes 1 closely. Heat transfer coefficients between the gas stream flowing in annular passages 2 and the passage walls (that is, the outer surface of ion transport tubes 1 and the inner surface of shroud tubes 3) will also be high as a result of the passage geometry.

The inner side of shell 14 of the reactor is furnished with baffles 4 which are arranged with varied axial spacing. Oxygen-containing gas 18 enters the reactor shell side at the end opposite to annular passage 2 entrance. The entering gas flows in crosscounter flow relative to the flow direction of the gas stream in annular passages 2 (that is, relative to ion transport tubes 1). The local heat transfer coefficients between the shell-side gas stream and shrouds 3 can be controlled by proper selection of the local crossflow velocities and the local baffle area, both of which depend upon baffle spacing or by surface geometry including insulating layers if required. A typical baffle spacing arrangement is given in Table II, with distance in inches:

TABLE II

| Baffle No. | Spacing between baffles (in.) | Distance from Tube Sheet 21 (in.) |
| --- | --- | --- |
| 1 | 6 | 6 |
| 2 | 3 | 9 |
| 3 | 3 | 12 |
| 4 | 2.5 | 14.5 |
| 5 | 2.5 | 17 |
| 6 | 2 | 19 |
| 7 | 2 | 21 |
| 8 | 2 | 23 |
| 9 | 2 | 25 |
| 10 | 1.5 | 26.5 |
| 11 | 1.5 | 28 |
| 12 | 1.5 | 29.5 |
| 13 | 1.5 | 31 |
| 14 | 1.5 | 32.5 |
| 15 | 1.5 | 34 |
| 16 | 1.13 | 35.13 |

As has been mentioned previously, the temperature of ion transport tubes 1 has to be maintained at a relatively uniform level to ensure the most effective utilization of the reactor. This can be accomplished with the selected arrangement in the following way. Since in most instances the mass flow on the shell side significantly exceeds that on the reaction side, the heat of reaction has to be absorbed primarily by the temperature rise of the shell-side gas stream. Therefore, oxygen-containing gas stream 18 must enter the reactor at a temperature significantly below the reaction temperature. To prevent local depressions and elevations of the ion transport tube 1 temperature, it is important that the gas stream enters annular passage 2 at a temperature reasonably close to the reaction temperature and that the local heat transfer between the shell-side gas stream and shroud 3 is essentially constant over the total axial length of annular passage 2. In general, this means that where the $\Delta T$ is large, heat transfer coefficients and baffle area density have to be low, that is, the baffle spacing is wide; where the $\Delta T$ is small, heat transfer coefficients and baffle area density have to be high, that is, the baffle spacing is close.

It should be noted that the above discussion is somewhat oversimplified in that reaction rates are not necessarily uniform along the entire length of the reactor since they vary not only with temperature but also with the local chemical driving potential for oxygen transport and the local reaction kinetics. As a later example will illustrate, a comprehensively detailed reactor design requires a fairly complex analysis in which all of these factors are taken into account. Nevertheless, maintaining the solid electrolyte ionic conductor element temperature profile relatively uniform remains the guiding design goal and the ability to vary baffle axial spacing provides the necessary flexibility to achieve this goal as does the ability to add an insulation layer of appropriate thickness if the $\Delta T$'s are very large. This aspect of the invention, in particular, differentiates the invention from the earlier Electropox methods developed by British Petroleum.

In the design it is also important to balance local oxygen flux and reaction kinetics to make sure that local oxygen partial pressures are at a level assuring material stability, that is, typically above $10^{-15}$ to $10^{-17}$ atm. for presently known materials. The oxygen flux will be a complex function dependent on material ionic conductivity, solid electrolyte wall thickness, reaction kinetics, the reactant gas partial pressure, and catalytic activity, which can be influenced by catalyst selection and catalyst extended area.

Gas flow on the reaction side (permeate side) of ion transport tubes 1 can be counter-current or concurrent. The direction of gas flow can be important under some circumstances since it will affect local reaction kinetics and oxygen partial pressure environments. The latter aspect does have an effect on oxygen flux, material stability and compositional stresses.

Ion transport tubes 1 can be fixed in the lower tube sheet or flexibly sealed by o-rings 6. Ion transport tubes 1 must be able to slide to accommodate axial growth resulting from thermal and compositional expansion. In FIG. 1, ion transport tubes 1 are sealed at their top ends by o-rings 6. If, in addition, ion transport tubes 1 are flexibly sealed at their bottom ends, a stop must be provided to limit travel of ion transport tubes 1 due to thermal and compositional expansion.

In the design of FIG. 1, tube sheets 7, 8 and 21 and shell 14 are insulated by insulation 15 and maintained at lower temperatures to permit the use of less expensive materials for construction. Optionally, tube sheets 7, 8 and 21 may be actively cooled by an independent gas stream, not shown.

Various partial or complete oxidation reactions such as disclosed by Mazanec et al. in U.S. Pat. No. 5,306,411, incorporated herein by reference, can be conducted within tubes 1.

The design illustrated in FIG. 1 can also be used as a combustor. In a first cocurrent construction, the reaction side gas flow is cocurrent with feed gas stream travelling along passage 2 and tube sheet 7 can be eliminated, since the exiting streams from both sides of the reactor can be joined to exit together through upper port 9. In another cocurrent construction, consideration of oxygen mass transfer resistance becomes less important and it may be possible to eliminate shroud tube 3 since normally significant amounts of excess oxygen are available. Oxygen-containing gas stream 18 would then be fed into the shell 14 through port 12, shown in phantom, and withdrawn on the other end through port 9. Baffles 4 with variable axial spacing continue to be required, as before, to obtain relatively constant local heat flux for transferring the heat of reaction from ion transport tubes 1 to the shell-side gas stream. In this second combustor construction, baffle spacing is wide toward the bottom and narrow toward the top of the module 17.

FIG. 2 shows a detail of a variation of the previous design which is functionally equivalent. To avoid stresses in ion transport tubes 28, their ends are sealed at their tops by a top seal cover 26 and are left free floating within shroud 38. A third concentric inner tube 30 is added inside each ion transport tube 28 for either supply or withdrawal of reaction side gases. To accommodate this flow arrangement, the double tube sheet shifts from top to bottom with the space between the two lower tube sheets 27 being available for either feed or withdrawal of reaction side gas streams. Flow of oxygen-containing gas stream 36 in FIG. 2 is identical to that in FIG. 1 as are the reaction, heat transfer, and gas flow relationships. The flow of oxygen-containing gas stream 36 is directed by baffles 40. Reactant gas stream 32 flows inside concentric inner tube 30 and then through annular passage 29 formed by concentric inner tube 30 and ion transport tube 28. Reactant gas stream 32 reacts with the oxygen gas as it permeates through ion transport tubes 28 to produce a gas stream 34 which exits the reactor. Oxygen-depleted gas stream 42 also exits the reactor. The advantages of the design of FIG. 2 over that of FIG. 1 are elimination of stresses on ion transport tubes 28 from differential expansion and radial misalignment, and requirement for only one ion transport tube-to-tube sheet seal. Disadvantages in this arrangement are the need for concentric inner tube 30 and the need to provide ion transport tubes 28 with a closed end during their manufacture.

Figure 3A:
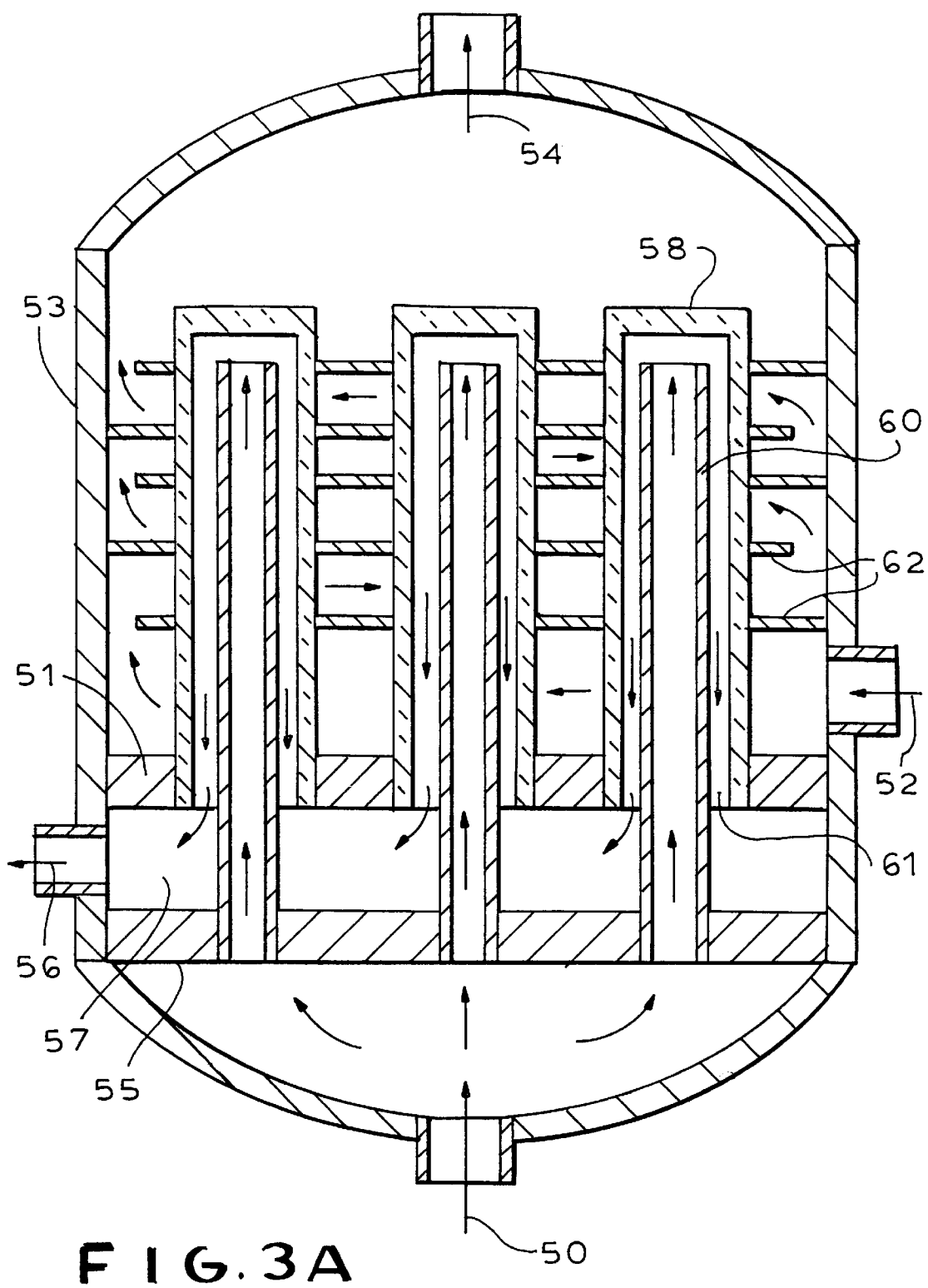
FIG. 3A is a schematic diagram of an embodiment of the invention similar to FIG. 2 wherein the sides for oxygen-containing gas streams and reactant gas streams are reversed.

The sides for oxygen-containing gas streams and reactant gas streams of FIG. 2 are reversible with relatively minor variations, as shown in FIG. 3A. The reversed arrangement of FIG. 3A might be especially suitable for composite thin film ion transport tubes which can be manufactured in larger diameters. In this case, oxygen-containing feed gas stream 50 enters shell 53 and flows through concentric inner tube 60 which now heats the entering feed gas stream and also enjoys close radiative heat transfer coupling with the reacting surface of ion transport tube 58. Oxygen-containing feed gas stream 50 then flows along ion transport tube 58 through annular passage 61 formed by concentric inner tube 60 and ion transport tube 58. As before, heat transfer coefficients must be high to elevate the temperature of the entering feed gas stream as close as possible to the reaction temperature and must be variable to minimize axial variations in the local heat flux.

Figure 3B:
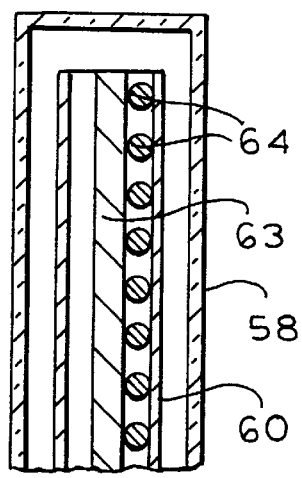
FIG. 3B is a schematic diagram showing a detail of the concentric inner tube and the ion transport tube of FIG. 3A showing the variable area inserts or variable pitch spiral inserts used to vary the local heat transfer coefficients.
Figure 3C:
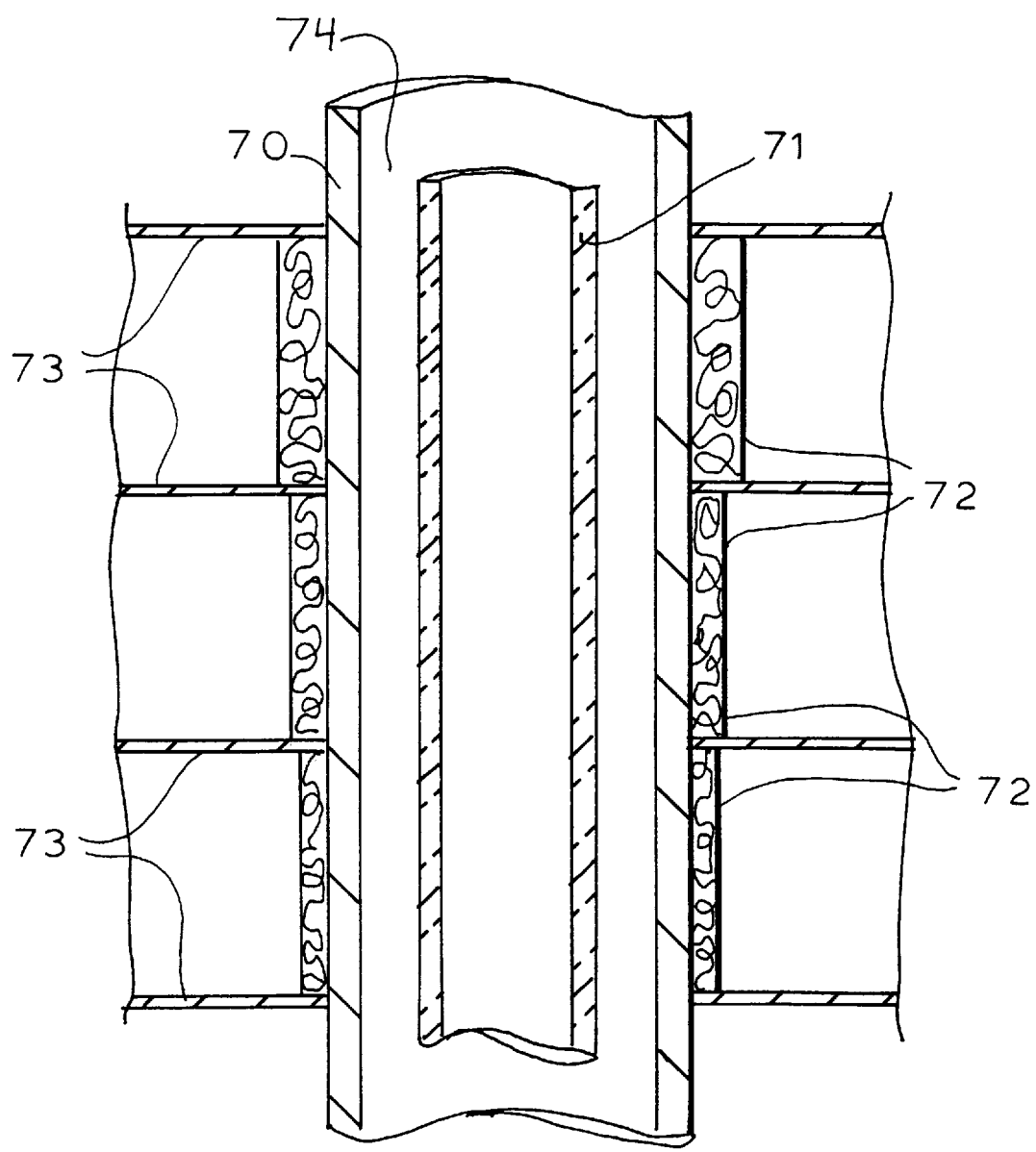
FIG. 3C is a schematic diagram showing an alternative detail of an ion transport tube showing the variable insulation thickness inserts disposed on a shroud tube to vary the local heat transfer coefficients.

Varying heat transfer coefficients is possible by controlling the local velocities and/or by using variable geometry of tubes 60 or 58, variable area inserts, variable pitch spiral inserts, or an insulating insert of variable thickness. FIG. 3B is a schematic diagram showing a detail of concentric inner tube 60 and ion transport tube 58 of FIG. 3A showing variable area inserts 63 or variable pitch spiral inserts 64 used to vary the local heat transfer coefficients. FIG. 3C is a schematic diagram showing an alternative detail of a concentric shroud tube 70 and ion transport tube 71 where variable insulation thickness inserts 72 are used to vary the local heat transfer coefficients as a gas stream is guided by baffles 73 and another gas stream flows along annular passage 74. The number of variable insulation thickness inserts 73 can vary from one or more (for example, five) and can alternatively be on the inner surface of shroud tube 70 or, where ion transport is not needed, on the outer surface of ion transport tube 71. Other schematic variations of FIG. 3C would be apparent to those skilled in the art.

In FIG. 3A, as in FIG. 1, mass transfer resistance in annular passages 61 will be low with the selected geometry. Reactant mixture gas stream 52 enters the baffled shell side of the reactor on either end depending on whether concurrent or countercurrent flow is desired; reactant stream 52 is directed in FIG. 3A by baffles 62 and exits as stream 54. An outer shroud tube is eliminated in this embodiment since mass transfer on the reactant side is not as critical in this arrangement. Oxygen-depleted gas stream 56 exits into space 57 between tube sheets 51 and 55 from where it can be withdrawn.

The overall design considerations for the reactor of FIG. 3A are very similar as those for FIG. 1 as is its functionality. As such, it has the advantages of free floating tube ends and absence of an upper tube sheet. Furthermore, since oxygen-containing gas stream 50 enters the reactor at a temperature substantially below the reaction temperature, tube sheets 51 and 55 and tube-to-tube sheet joints can be kept at a relatively low temperature to permit use of inexpensive construction materials and relatively standard sealing techniques such as welding or brazing. A disadvantage is that control of temperature profiles may not be quite as good as for the design of FIG. 1.

Figure 4A:
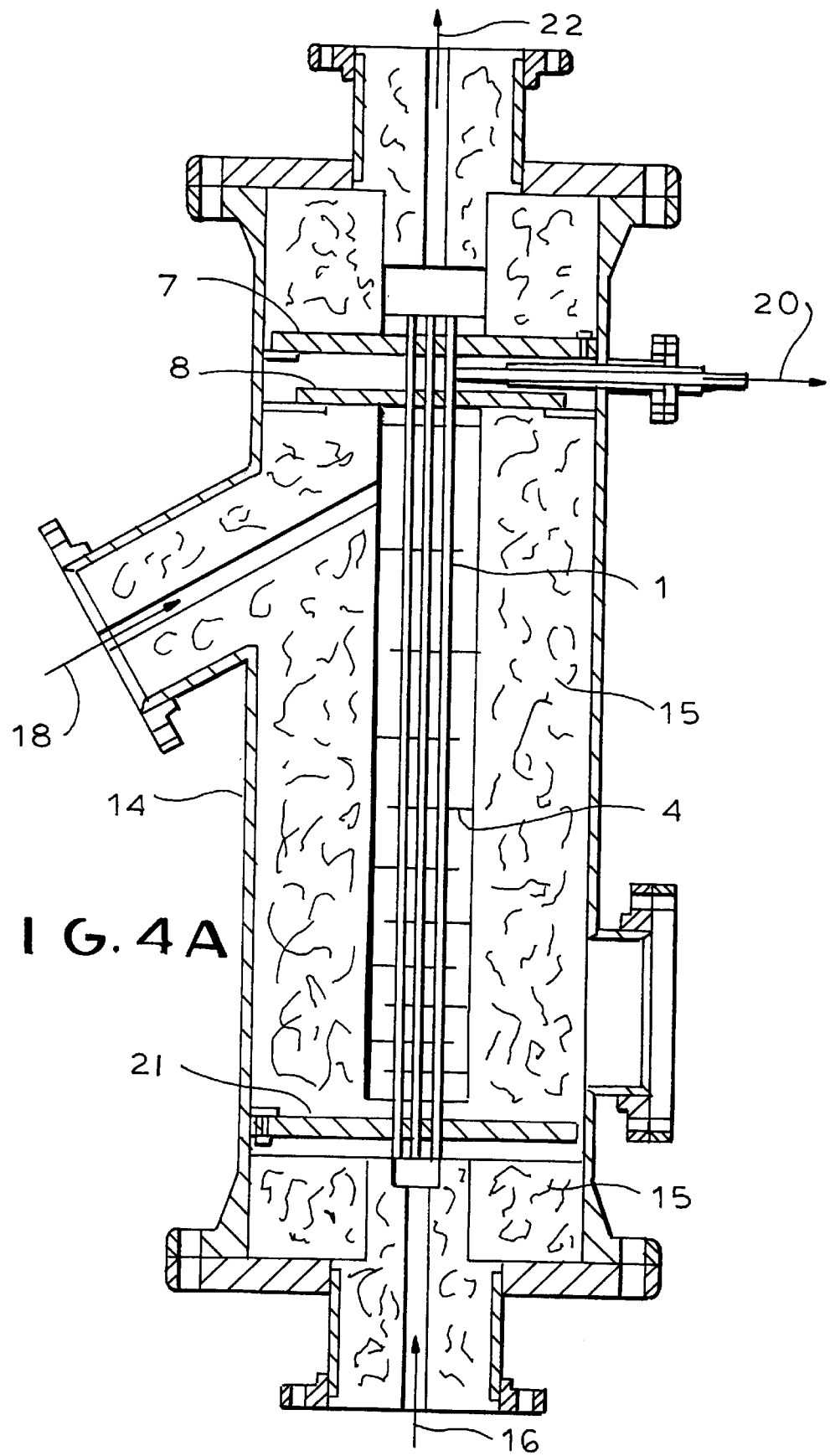
FIG. 4A is a diagram of an embodiment of the invention similar to that of FIG. 1 that optimizes heterogeneous reaction, oxygen flux, and heat transfer.
Figure 4B:
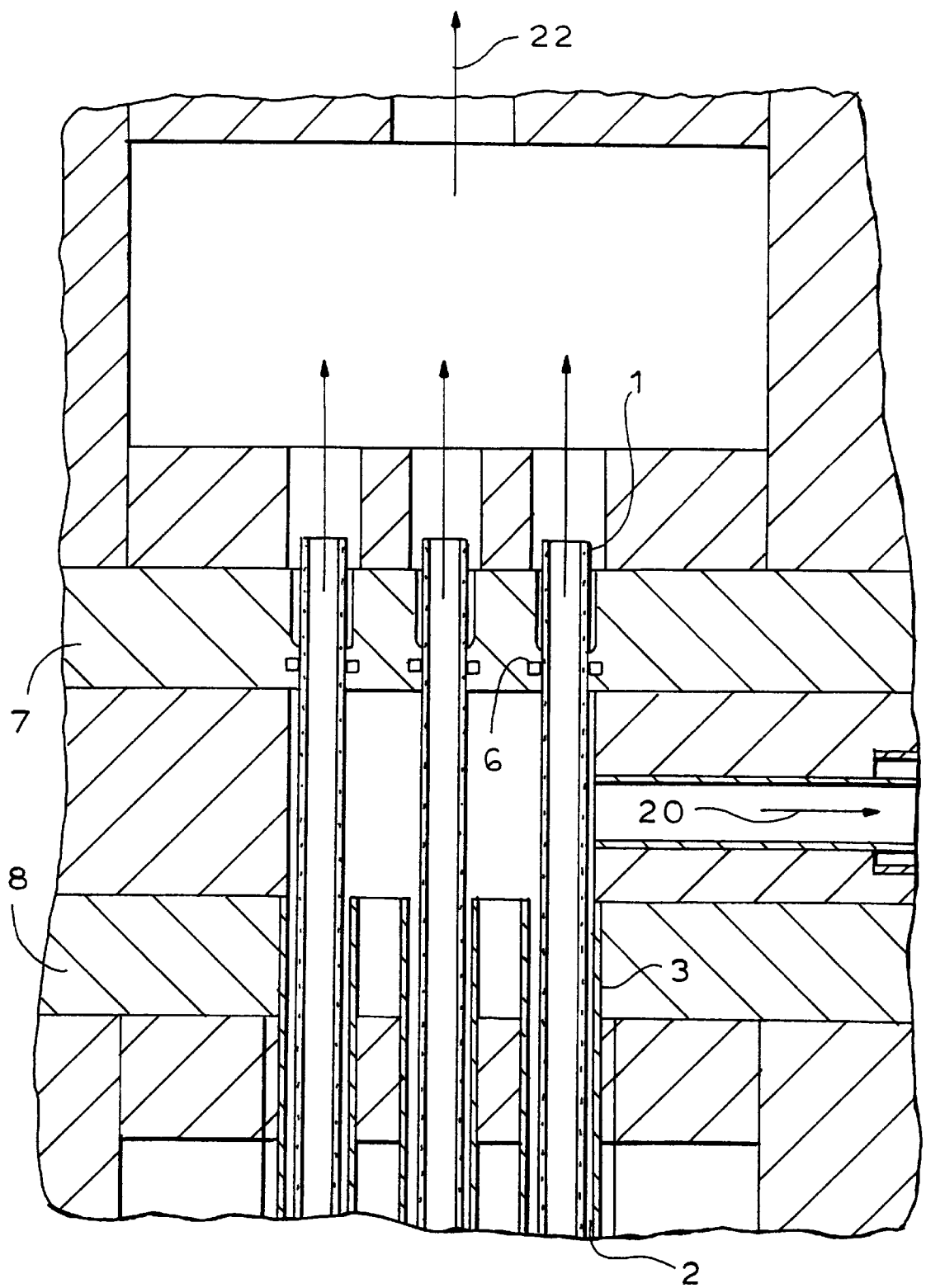
FIG. 4B is a diagram showing a detail of the upper part of FIG. 4A.
Figure 4C:
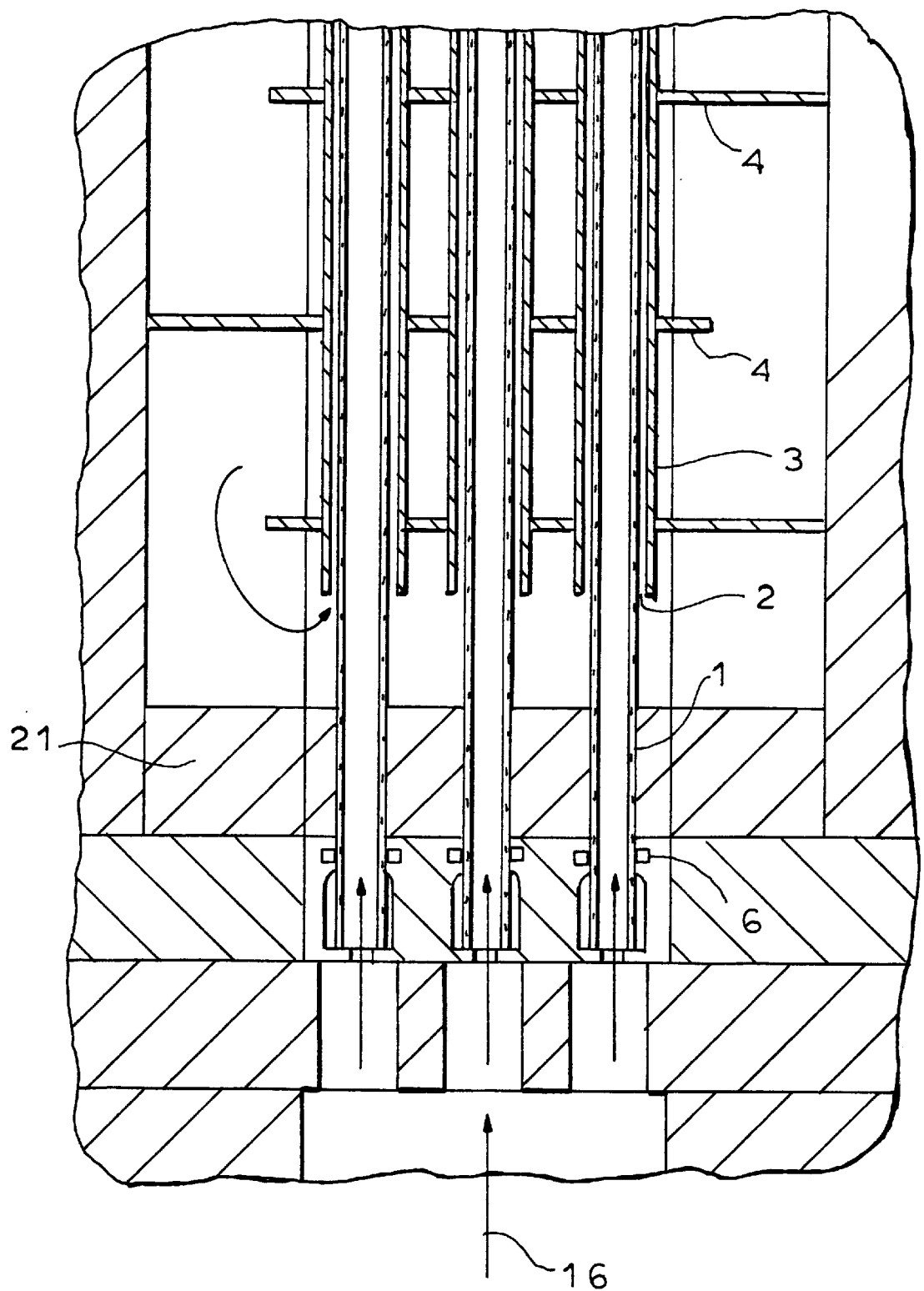
FIG. 4C is a diagram showing a detail of the lower part of FIG. 4A.

FIG. 4A shows an example of a reactor similar to that of FIG. 1 that was designed to remove 2% of contained oxygen from a nitrogen gas stream to attain a product gas purity of less than 10 ppm oxygen and further illustrates the general principles of the invention. FIG. 4B is a diagram showing a detail of the upper part of FIG. 4A and FIG. 4C is a diagram showing a detail of the lower part of FIG. 4A.

| Reactor Example (FIG. 4A) | |
| --- | --- |
| Feed Nitrogen gas stream | 500 NCFH with 2 vol. % oxygen at 150 psig and 20C |
| Required product purity | less than 10 ppm oxygen |
| Reactive purge stream | 75 NCFH nitrogen, 15 NCFH $CH_4$ at 148 psig |
| Ion transport tube material | $La_{0.4}Sr_{0.6}Fe_{0.69}Cr_{0.2}Co_{0.1}Mg_{0.01}O_{3-x}$ with 20 wt. % Pd—Ag second phase at Pd/Ag = 1 |
| Membrane conductivity at 1000C | 0.25 Siemens/cm |
| Ion transport tube dimensions | 0.42 in. OD × 0.049 in. wall × 42 in. long (35 in. active) |
| Number of ion transport tubes | 7 |
| Catalyst on anode | up to 0.02 in. thick porous surface of wall material |

The FIG. 4A Reactor Example embodiment was designed using a heterogeneous reaction model based on specific reactant species such as methane, a multiresistance oxygen flux model, and a heat transfer model. The operation of the embodiment of the invention shown in FIG. 4A is similar to that of FIG. 1. As mentioned previously, FIGS. 4B and 4C respectively show details of the top section and bottom section of FIG. 4A and should be consulted to see the details of the construction of those areas of FIG. 4A as described below.

In FIG. 4A, oxygen-containing gas stream 18 enters shell 14 near the top of the reactor, flows downward in a cross-counter flow fashion to the flow of reactive purge or reactant gas stream 16 inside ion transport tubes 1 directed by baffles 4, and then enters annular passages 2 between ion transport tubes 1 and shroud 3 (shown in the detailed view of FIG. 4B) where oxygen is extracted from the gas stream and is recovered as an oxygen-depleted gas stream 20 from the space between tube sheets 7 and 8. Reactant gas stream 16 flows inside ion transport tubes 1 which reacts with the oxygen gas as it permeates through ion transport tubes 1 to produce a gas stream 22 which exits the reactor. As before, the oxygen for the reaction on the permeate side of ion transport tubes 1 is extracted by ion transport from oxygen-containing gas stream 18 flowing through annular passages 2. Gaseous diffusion resistance is minimized by the narrow width of annular passages 2 between ion transport tubes 1 and their respective shrouds 3. The reaction takes place in the boundary layer or on the anode surface (permeate side) of ion transport tubes 1. As a result, the maximum temperature will be at the wall of ion transport tubes 1. The concentric arrangement of ion transport tubes 1 and shroud tubes 3 assures excellent radiation heat transfer coupling between them and, since at the high operating temperatures radiation heat transfer is very efficient, the local temperatures of shroud tubes 3 will follow the local temperature of their respective ion transport tubes 1 closely.

Heat transfer coefficients between the gas stream flowing in annular passages 2 and the passage walls (that is, the outer surface of ion transport tubes 1 and the inner surface of shroud tubes 3) will also be high as a result of the passage geometry. The inner side of shell 14 of the reactor is furnished with baffles 4 which are arranged with varied axial spacing. Oxygen-containing gas 18 enters the reactor shell side at the end opposite to annular passage 2 entrance. The entering gas flows in crosscounter flow relative to the flow direction of the gas stream in annular passages 2 (that is, relative to ion transport tubes 1). The local heat transfer coefficients between the shell-side gas stream and shrouds 3 can be controlled by proper selection of the local crossflow velocities and the local baffle area, both of which depend upon baffle spacing or by surface geometry including insulating layers if required.

As has been mentioned previously, the temperature of ion transport tubes 1 has to be maintained at a relatively uniform level to ensure the most effective utilization of the reactor. This can be accomplished with the selected arrangement in the following way. Since in most instances the mass flow on the shell side significantly exceeds that on the reaction side, the heat of reaction has to be absorbed primarily by the temperature rise of the shell-side gas stream. Therefore, oxygen-containing gas stream 18 must enter the reactor at a temperature significantly below the reaction temperature.

To prevent local depressions and elevations of the ion transport tube 1 temperature, it is important that the gas stream enters annular passage 2 at a temperature reasonably close to the reaction temperature and that the local heat transfer between the shell-side gas stream and shroud 3 is essentially constant over the total axial length of annular passage 2. In general, this means that where the ΔT is large, heat transfer coefficients and baffle area density have to be low, that is, the baffle spacing is wide; where the ΔT is small, heat transfer coefficients and baffle area density have to be high, that is, the baffle spacing is close.

As seen in FIG. 4C, ion transport tubes 1 can be fixed in the lower tube sheet or flexibly sealed by o-rings 6. Ion transport tubes 1 must be able to slide to accommodate axial growth resulting from thermal and compositional expansion. As seen in FIG. 4B, ion transport tubes 1 are sealed at their top ends by o-rings 6. If, in addition, ion transport tubes 1 are flexibly sealed at their bottom ends, a stop must be provided to limit travel of ion transport tubes 1 due to thermal and compositional expansion. In the design of FIG. 4A, tube sheets 7, 8 and 21 and shell 14 are insulated by insulation 15 and maintained at lower temperatures to permit the use of less expensive materials for construction. Optionally, tube sheets 7, 8 and 21 may be actively cooled by an independent gas stream, not shown.

The multiresistance oxygen flux was calculated by coupling the equations for the interface kinetics on the cathode and the anode sides with the diffusion process inside the ion transport membrane. On both surfaces the driving force for the oxygen flux is the oxygen potential gradient across the specific surface. On the cathode the oxygen flux is proportional to oxygen vacancy concentration in the membrane material and the square root of the oxygen partial pressure. On the anode the reactant oxidation rate is proportional to the partial pressure of the reactant species and the vacancy concentration at the membrane wall. The diffusion of oxygen in the wall follows the well-known Nernst Equation:

$$J_o = \frac{RTS}{16F^2L} \ln\left(\frac{p_2}{p_1}\right) \quad (1)$$

where

S is the ionic conductivity;

L is the wall thickness;

R is the gas constant ($8.31 \times 10^3$ J•kmol$^{-1}$);

ΔT is the temperature (K);

F is the Faraday constant ($9.65 \times 10^7$ C•kmol$^{-1}$);

$p_1$ is the partial pressure of $O_2$ at the cathode wall of the membrane; and $p_2$ is the partial pressure of $O_2$ at the anode wall of the membrane.

Figure 6:
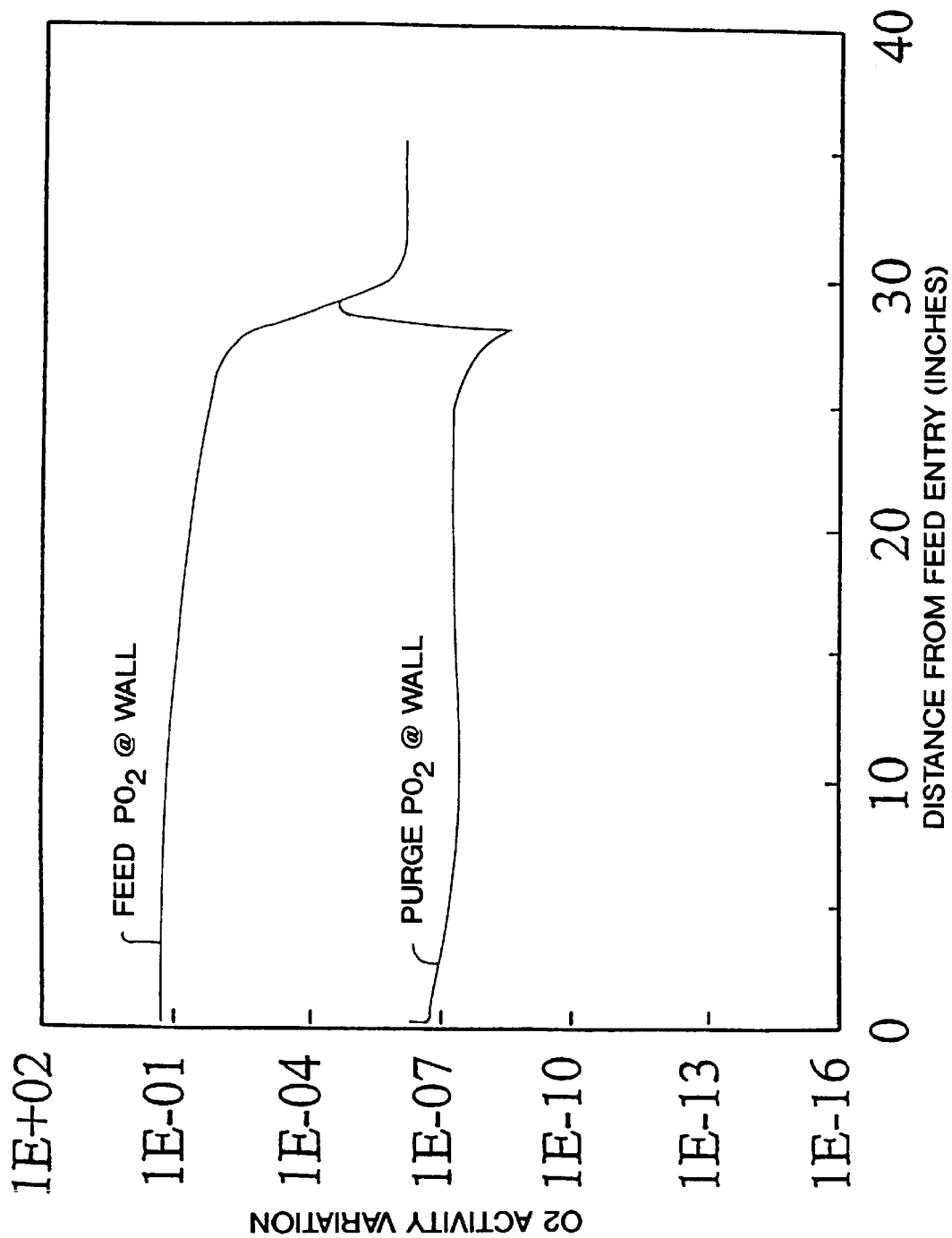
FIG. 6 is a graph showing the calculated feed and purge oxygen partial pressure profiles at the wall of the reactor of FIG. 4 as a function of distance from the feed entry.

The calculated results from the Reactor Example of FIG. 4A were as follows. The required crude nitrogen reactor inlet temperature was found to be 855 C. FIG. 5 is a graph showing the calculated temperature profiles of various elements of the Reactor Example of FIG. 4A as a function of distance from the feed entry. FIG. 6 is a graph showing the calculated feed and purge oxygen partial pressure profiles at the wall of the Reactor Example of FIG. 4A as a function of distance from the feed entry. The Reactor Example design of FIG. 4A is successful since the ion transport tube wall temperature variations are below 100 C and the oxygen partial pressures are greater than $10^{-10}$ atm. along the entire length of the ion transport tube wall.

As mentioned earlier, it is possible to combine a ion transport reactor with other duties in a single shell design. The most prominent possible applications are for reactor/heaters and reactor/oxygen separators.

Figure 7A:
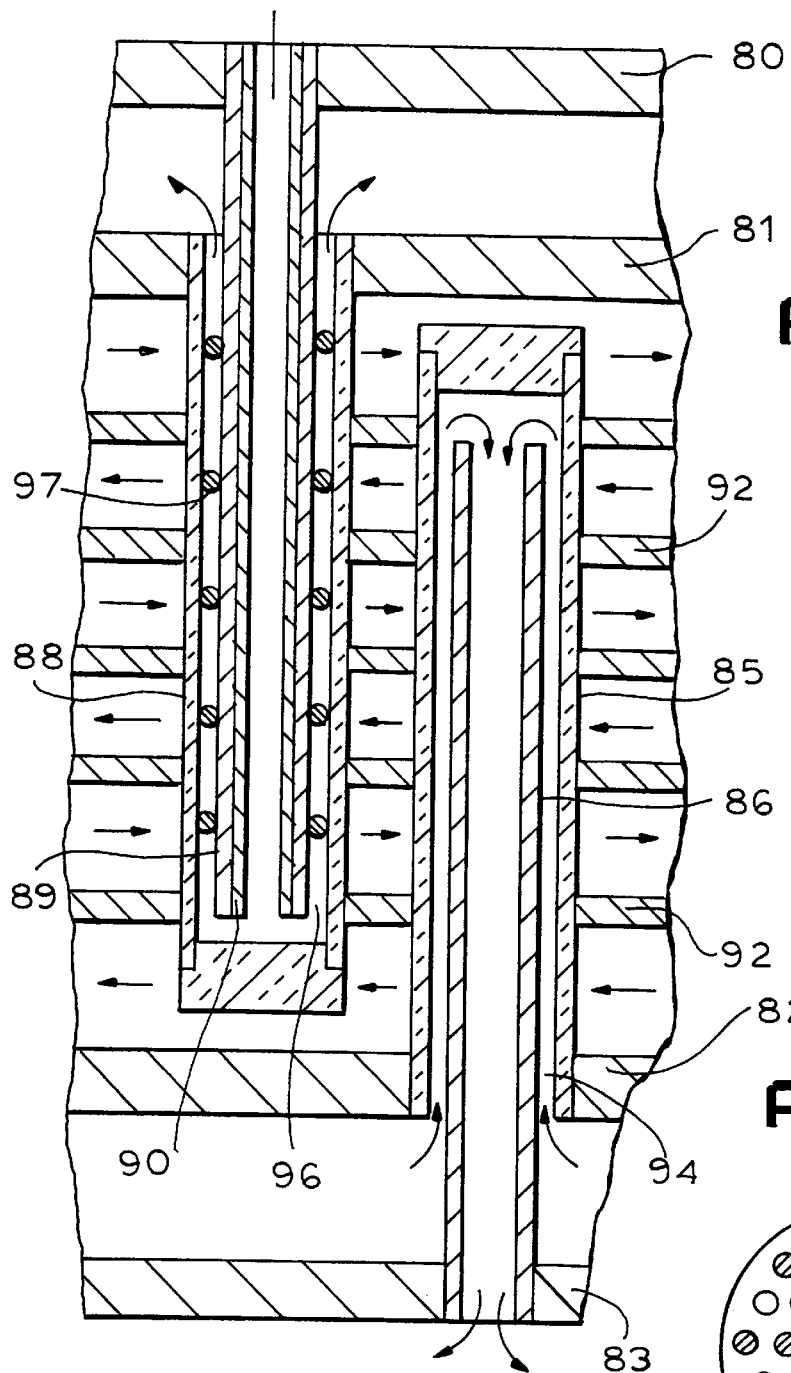
FIG. 7A is a schematic diagram of an embodiment of the invention showing a detail of an ion transport reactor/heater with closed and free-floating tube ends.

FIG. 7A is a schematic diagram illustrating a detail of one embodiment of an ion transport reactor/heater according to the present invention. The reactor/heater of FIG. 7A features pairs of tube sheets 80 and 81, 82 and 83, on either end of the apparatus. From one side rows of ion transport tubes 85 penetrate the shell space; from the other side rows of heater tubes 88 for a third gas stream penetrate the shell space. Ion transport tubes 85 and heater tubes 88 both have free floating closed ends and can be arranged in alternating rows. Ion transport tubes 85 and heater tubes 88 also contain concentric inner tubes 86 and 89, respectively. Concentric inner tubes 86 allow for entry or withdrawal of the reactive gas mixture in the case of ion transport tubes 85; concentric inner tubes 89 allow for entry or withdrawal of the gas stream to be heated in the case of heater tubes 88. Preferably concentric tubes 89 inside heater tubes 88 are insulated by insulation 90 on their interior or exterior surface to retard heat exchange across concentric tube 89. The shell of the reactor/heater features baffles 92 at a variable axial spacing.

During operation, the reactive gas mixture is introduced into concentric inner tube 86 or into annular passage 94 at the bottom of ion transport tube 85, depending on whether concurrent or countercurrent flow with respect to the flow direction of the oxygen-containing gas on the shell side is desired. The reaction on the inner surface of ion transport tube 85 is supported by oxygen ion transport from the oxygen-containing gas stream across the ion transport tube wall. As shown in FIG. 7A, the gas stream to be heated enters through concentric inner tube 89 and picks up heat as it flows inside annular passage 96. The oxygen-containing gas enters the shell at the bottom of concentric inner tube 89 and flows cross-concurrently with respect to the gas stream to be heated. The heat of reaction is absorbed by a temperature rise of the oxygen-containing gas stream and the third gas stream in heater tube 88.

As in previous embodiments, the temperature of ion transport tube 85 should be maintained relatively constant for optimal performance. Heat is transferred to the third gas stream by both radiation and convection. Convection can be influenced again by variable baffle spacing to achieve high flow velocities and high convective coefficients near the bottom of concentric inner tube 89 where temperature differences are large and low flow velocities and low convective coefficients near the top of concentric inner tube 89 where temperature differences are small. The goal of achieving uniform heat flux can also be aided by providing variable convective coefficients for the third gas stream in annular passage 96. One way of achieving this is by using a variable pitch spiral insert 97 in annular passage 96 which yields high velocities at the bottom end of concentric inner tube 89 and low velocities at the top end of concentric inner tube 89.

Figure 7B:
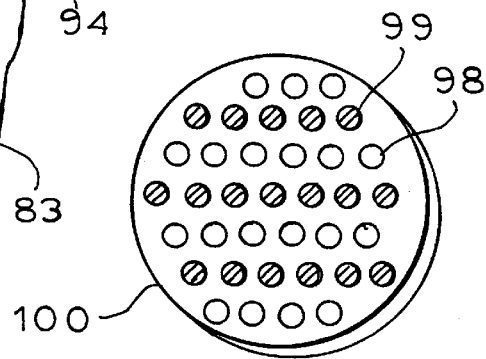
FIG. 7B is a schematic diagram of a tube sheet utilizable in the ion transport reactor/heater of FIG. 7A.

FIG. 7B is a schematic diagram of a tube sheet utilizable in the ion transport reactor/heater of FIG. 7A. Tube sheet 100 holds ion transport tubes 99 with heater tubes 98 in alternating rows.

The advantages of using a combined reactor and heater in a single unit include the opportunity for simplification of process systems and the freedom of handling higher heats of reaction in cases where the heat capacity of the oxygen-containing gas is insufficient.

Figure 8A:
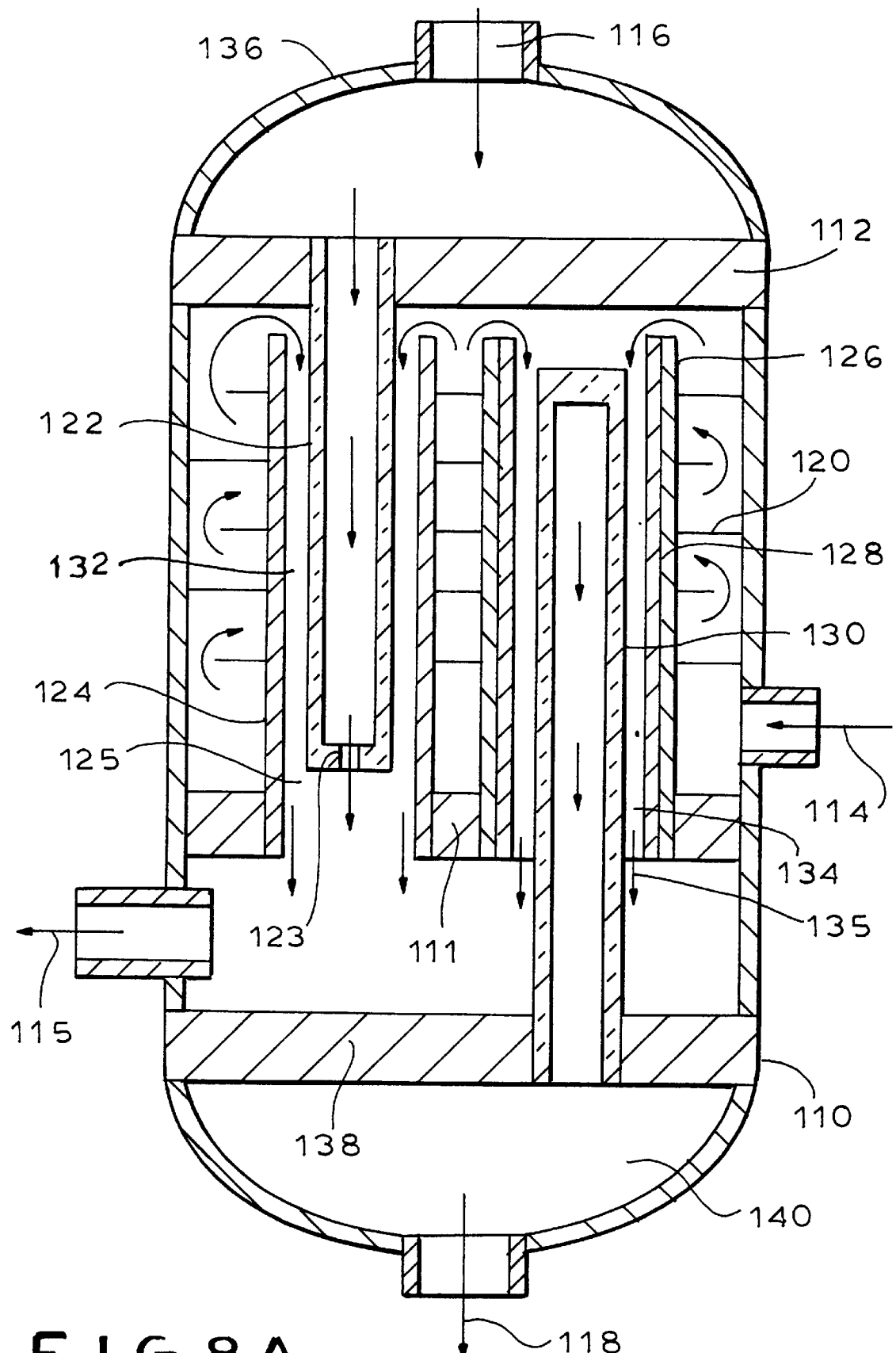
FIG. 8A is a schematic diagram of an embodiment of the invention showing an ion transport reactor/oxygen separator with closed and free-floating tube ends.

FIG. 8A is a schematic diagram showing a ion transport reactor/oxygen separator. The ion transport reactor/oxygen separator heats an oxygen-containing gas stream, such as air, to ion transport operating temperature and extracts a pure oxygen product stream. In FIG. 8A, ion transport reactor tube 122 is attached and sealed at one end at top tube sheet 112. The other end of ion transport reactor tube 122 is free-floating and has a flow restricting or flow distributing orifice 123 at its end. Annular passage 125 is formed between the outer wall of ion transport tube 122 and the inner wall of shroud tube 124. A closed end ion transport separator tube 130 is attached and sealed at bottom tube sheet 110. Annular passage 135 is formed between the outer wall of ion transport separator tube 130 and the inner wall of shroud tube 128. Both shroud tubes 124 and 128 are open at their top ends and both are attached and sealed at tube sheet 111.

During operation, reactant gas stream 116 is introduced to the inside of ion transport reactor tube 122 at the top of the apparatus and flows downward in annular passage 125. Oxygen is transferred by ion transport across ion transport reactor tube 122 and supports a reaction on its surface. The heat of reaction is rejected to the shell-side gas stream through shroud tube 124 and baffles 120. The products of reaction exit at the bottom of the ion transport reactor tube 122 through flow restricting and distributing orifice 123 in the bottom of reactor tube 122 into space 138 between bottom tube sheets 110 and 111. Oxygen-containing gas stream 114 enters shell 136, flows upward through baffles 120 along tubes 124 and 126 in shell 136 where it is heated to ion transport separator operating temperature (700° C. to 1050° C.), and then enters annular passage 132 and passage 134, as shown by arrow 135, between ion transport separator tube 130 and shroud tube 128. Ion transport separator tube 130 is closed at its upper end. Oxygen is transported across the wall of ion transport separator tube 130 by maintaining a positive ratio of oxygen partial pressures across its wall and oxygen gas stream enters space 140 below tube sheet 110 and exits shell 136 as gas stream 118. Both reaction products and the depleted oxygen stream enter common space 138 between bottom tube sheets 110 and 111 and exit shell 136 as gas stream 115.

As in the previous examples, the heat of reaction must be absorbed by the temperature rise of the oxygen-containing gas stream and the temperature of ion transport reactor tube 122 maintained at as uniform a temperature as possible. As mentioned before, this can be achieved by maintaining a constant local heat flux by controlling the local heat transfer coefficients by means of variable baffle spacing. To avoid damaging heat loss from the oxygen-containing gas stream in annular passage 135 and temperature depressions in ion transport separator tube 130, shroud tube 128 is insulated, preferably at its outer surface.

Figure 8B:
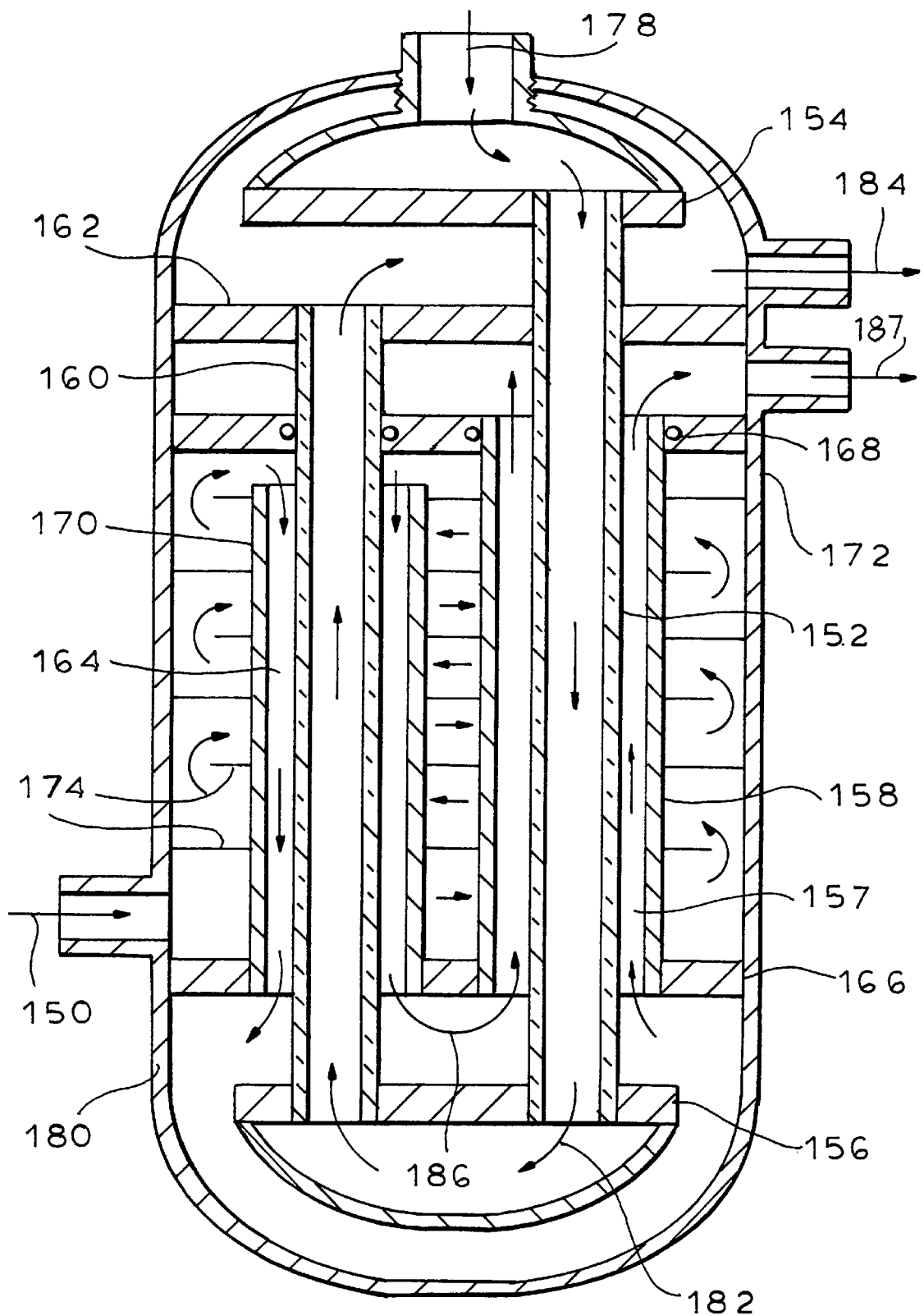
FIG. 8B is a schematic diagram of an embodiment of the invention showing an ion transport reactor/oxygen separator with a through tube arrangement.

FIG. 8B is a schematic diagram showing an alternative design of an ion transport reactor/oxygen separator. The ion transport reactor/oxygen separator heats an oxygen-containing gas stream, such as air, to ion transport operating temperature and extracts a pure oxygen product stream. In FIG. 8B, ion transport reactor tube 152 are attached and sealed at the top end by top tube sheet 154 and at the bottom end by bottom tube sheet 156. Annular passage 157 is formed between the outer wall of ion transport reactor tube 152 and the inner wall of shroud tube 158. Ion transport separator tube 160 is attached and sealed at the top end by top tube sheet 162 and at the bottom end by bottom tube sheet 156. Annular passage 164 is formed between the outer wall of ion transport separator tube 160 and the inner wall of shroud tube 170. Both shroud tubes 170 and 158 are open at both ends and both are attached and sealed at tube sheet 166; shroud tube 158 is additionally attached and sealed at tube sheet 172. As with other configurations where tubes are attached at each end, sliding seals 168 are used to seal one end of ion transport reactor tube 152, ion transport separator tube 160, and shroud tube 158.

During operation, an oxygen-containing feed gas stream 150 enters shell 180, flows upward through baffles 174 in shell 180 where it is heated to ion transport separator operating temperature (700° C. to 1050° C.), and then enters annular passage 164 between ion transport separator tube 160 and shroud tube 170. Oxygen is transported across the wall of ion transport separator tube 160 by maintaining a positive ratio of oxygen partial pressures across its wall and the oxygen gas stream joins reaction product gas stream 182 and the combined gas stream exits shell 180 as gas stream 184. Retentate gas stream 186 containing some oxygen then enters annular passage 157 between ion transport reactor tube 152 and shroud tube 158. At the same time, reactant gas stream 178, which may optionally contain steam as well, is introduced to the inside of ion transport reactor tube 152 at the top of the apparatus and flows downward. Oxygen is transferred from gas stream 186 by ion transport across ion transport reactor tube 152 and supports a reaction on its surface, and the retentate gas stream exits shell 180 as gas stream 187. The heat of reaction is rejected to the shell-side gas stream through shroud tube 158 and baffles 174. Reaction product gas stream 182, as noted above, joins the oxygen permeating through ion transport separator tube 160 and the combined gas stream exits shell 180 as gas stream 184.

The embodiment illustrated in FIG. 8B maximizes the driving force for oxygen transfer in the ion transport separator tube 160 because all the air, rather than only a portion, first flows by ion transport separator tube 160 and because the products of combustion gas stream 182 from ion transport reactor tube 152 is used to purge of the permeate side of ion transport separator tube 160 to lower the oxygen partial pressure on that side. Mechanically this embodiment is complex, having five tube sheets (the two outer ones floating), and at least two sliding seals. Fortunately the two sliding seals isolate entering and exiting retentate gas streams where the pressure difference due to the retentate passage pressure drops is small.

As in the previous examples, the heat of reaction must be absorbed by the temperature rise of the oxygen-containing gas stream and the temperature of ion transport reactor tube 152 maintained at as uniform a temperature as possible. As mentioned before, this can be achieved by maintaining a constant local heat flux by controlling the local heat transfer coefficients by means of variable baffle spacing. To avoid damaging heat loss from the oxygen-containing gas stream in annular passage 164 and temperature depressions in ion transport separator tube 160, shroud tube 170 is insulated, preferably at its outer surface.

It is likely that different ion transport ionic conductor materials will be selected for the reactor and separator duties to provide optimum service. Materials selected for reactor service should have maximum stability at low oxygen partial pressures such as the chromium-containing perovskites listed in Table 1 and materials selected for oxygen separation service should be those having high ionic conductivity at high partial oxygen pressures.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

What is claimed is:

1. A process for reacting a reactant gas stream with oxygen from a feed gas stream containing elemental oxygen and at least one other gas using an ion transport reactor including an ion transport membrane having a retentate side and a permeate side, said process comprising:
   (a) flowing the feed gas stream on the retentate side of the ion transport membrane; and
   (b) flowing the reactant gas stream on the permeate side of the ion transport membrane,
   wherein heat generated from the reactant gas stream reacting with the oxygen permeating through the ion transport membrane is transferred to the feed gas stream to heat the feed gas stream while maintaining the temperature of the ion transport membrane within the operation range of the ion transport membrane.

2. The process according to claim 1 wherein the operation range is from about 500° C. to about 1100° C.

3. The process according to claim 1 wherein the temperature along the ion transport membrane is kept substantially constant throughout the length of the membrane.

4. The process according to claim 3 wherein the temperature along the ion transport membrane is maintained relatively constant within a range of about 200° C.

5. The process according to claim 1 whereby the resistances to oxygen permeation and reaction kinetics are apportioned such that the partial pressure of oxygen on the permeate side of the membrane is kept above $10^{-16}$ atm.

6. The process according to claim 1 wherein the ion transport membrane has porous catalyst layers added to at least part of the permeate side of the ion transport membrane to enhance the chemical reactions on the surface.

7. The process according to claim 1 wherein at least part of one side of the membrane is doped to enhance surface exchange kinetics.

8. The process according to claim 1 wherein the flow of the feed gas stream is channeled along the retentate surface of the ion transport membrane through a feed gas passage between the ion transport membrane and a shroud to minimize gaseous diffusion resistance.

9. The process according to claim 8 wherein the heat transfer to the feed gas passage is modified by at least one of a variable geometry, variable baffle spacing, variable pitch spiral inserts, and an insulating insert of variable thickness.

10. The process according to claim 1 wherein at least a portion of the heat from the heat of reaction generated by operation of the ion transport membrane is transferred to a fluid stream flowing through the ion transport reactor.

11. The process according to claim 10 wherein at least one of the heat transfer areas and heat transfer coefficients vary inversely with the difference in temperature between the feed gas stream and the ion transport membrane.

12. The process according to claim 1 wherein the feed gas stream is divided into a first feed gas portion which is fed into the reactor and provides oxygen for reacting with the reactant gas stream, whereby heat is generated, the heat being employed to heat at least the first feed gas portion which transfers heat to an ion transport separator module including an ion transport separator membrane having a retentate side and a permeate side through which a second feed gas portion flows and from which oxygen is extracted along the permeate side thereof.

13. The process according to claim 1 wherein the feed gas stream first enters a separator stage where oxygen is extracted, by pressure-driven ion transport using an ion transport separator membrane, to a nonreacting gas side and the feed gas stream then enters the ion transport reactor where additional oxygen is extracted using the ion transport membrane to react with the reactant gas stream to produce a reaction product gas stream which is then used to purge the permeate side of the ion transport separator membrane.

14. An ion transport reactor for separating a feed gas stream containing elemental oxygen and at least one other gas, said reactor comprising:
   at least one ion transport tube having a membrane capable of transporting oxygen ions, the ion transport membrane having a retentate side and a permeate side, for extracting oxygen from the feed gas stream as it flows along the retentate side;
   wherein a reactant gas stream is flowed along the permeate side of the ion transport tubes to react with the oxygen permeating therethrough;
   wherein at least a portion of the heat from the heat of reaction generated by operation of the ion transport tube is transferred to a fluid stream flowing through the ion transport reactor; and
   wherein at least one of the heat transfer areas and heat transfer coefficients vary inversely with the difference in temperature between the feed gas stream and the ion transport membrane.

15. The ion transport reactor according to claim 14 further including a concentric tube within or surrounding at least part of each ion transport tube to form an annular passage therebetween for directing the flow of the feed gas stream along the ion transport tube.

16. The ion transport reactor according to claim 15 wherein the width of the annular passage is selected to minimize gaseous diffusion resistance.

17. The ion transport reactor according to claim 14 wherein at least one of the heat transfer areas and heat transfer coefficients vary along the length of the feed gas passage on the shell side by virtue of variable baffle spacing to achieve large heat transfer resistance where the difference in temperature is large and to achieve small heat transfer resistance where the difference in temperature is small or by virtue of variable insulation thickness.

18. The ion transport reactor according to claim 14 wherein the ion transport tube is closed at one end.

19. The ion transport reactor according to claim 14 wherein the feed gas stream flows along the outer of the ion transport tube.

20. The ion transport reactor according to claim 14 wherein the feed gas stream flows in a cross-counter, concurrent or countercurrent flow direction with respect to the ion transport tube.

21. The ion transport reactor according to claim 20 wherein the flow of the feed gas stream in directed baffles arranged with varied axial spacing.

22. The ion transport reactor according to claim 14 wherein the reactant gas stream flows along the inner side of the ion transport tube.

* * * * *